United States Patent [19]

Okazaki

[11] Patent Number: 4,810,344
[45] Date of Patent: Mar. 7, 1989

[54] WATER ELECTROLYZING APPARATUS

[75] Inventor: Tatsuo Okazaki, Kamifukuoka, Japan

[73] Assignee: Omco Co., Ltd., Saitama, Japan

[21] Appl. No.: 162,452

[22] Filed: Mar. 1, 1988

[30] Foreign Application Priority Data

Mar. 11, 1987 [JP] Japan ................................. 62-55683
Dec. 14, 1987 [JP] Japan ............................... 62-315705

[51] Int. Cl.⁴ ..................... C25B 15/02; C25B 15/08; C25B 9/00
[52] U.S. Cl. .................................. 204/228; 204/229; 204/257; 204/260; 204/DIG. 5
[58] Field of Search ................................ 204/228–229, 204/257–258, 260, DIG. 5, 263–266

[56] References Cited

U.S. PATENT DOCUMENTS

| | | | |
|---|---|---|---|
| 1,284,618 | 11/1918 | Dow | 204/257 |
| 1,869,153 | 7/1932 | Kean | 204/257 X |
| 3,790,449 | 2/1974 | Novak | 204/257 X |
| 3,827,964 | 8/1974 | Okubo et al. | 204/257 |
| 3,969,214 | 7/1976 | Harris | 204/DIG. 5 |
| 4,057,474 | 11/1977 | Kurtz et al. | 204/257 X |
| 4,533,451 | 8/1985 | Kumazawa | 204/260 X |

Primary Examiner—Donald R. Valentine
Attorney, Agent, or Firm—Armstrong, Nikaido Marmelstein & Kubovcik

[57] ABSTRACT

An electrolytically ionized water forming apparatus including: a plurality of electrolysis devices, each comprising an electrolysis vessel having a cathode and an anode opposed to each other and an electrolysis diaphragm partitioning the space between both of the electrodes into a cathode chamber and an anode chamber; water supply channels each disposed on one side and two discharge systems of an ionized alkaline water discharge channel in communication with the cathode chamber and an acidic water discharge channel in communication with the cathode chamber each disposed on the other side of the plurality of electrolysis devices respectively; the plurality of electrolysis devices being connected in series in a plurality of stages such that only one of the two ionized water discharge channels of the electrolysis device at a certain preceeding stage constitutes a water supply channel to the electrolysis device at the succeeding stage. Polarity of voltage applied to the electrolysis devices is preferably switched alternately at a predetermined time for enabling continuous operation. Magnetic supply unit or electron generating unit may be disposed to the electrolysis vessel thereby exerting magnetic effect or electrons on water during electrolysis.

10 Claims, 5 Drawing Sheets

WATER ELECTROLYZING APPARATUS

BACKGROUND OF THE INVENTION

Field of the Invention

The present invention concerns an apparatus for forming electrolytically ionized water and, more particularly, it relates a water electrolyzing apparatus using a plurality of electrolysis devices for electrolyzing water to form ionized alkaline water and acidic water in which they are connected such that only one of the electrolytically ionized water from an electrolyzing device at a certain stage is introduced to the water supply portion of the succeeding electrolysis device at the succeeding stage.

In an apparatus for electrolyzing water by charging water to an electrolysis vessel comprising an anode and a cathode partitioned by an electrolysis diaphragm and applying a DC voltage between both of the electrodes thereby obtaining ionized alkaline water and ionized acidic water, if the alkaline water and the acidic water discharged from the electrolysis device at the first stage are supplied to the cathode chamber and the anode chamber of the electrolysis device at the succeeding stage respectively and subjected to electrolysis again, there is no substantial change in the ion concentrations. In view of the above, the conventional apparatus for forming electrolytically ionized water have been constituted such that water is electrolyzed only once and then discharged to an external water tap.

However, such an electrolyzing process that is conducted only once results in the following problems.

At first, it is difficult to obtain a sufficient ionic concentration, for example, in the ionizied alkaline water by the electrolysis only once. Generally, water containing much nitrates or free carbonic ions are not suitable to drink and, particularly, nitrate concentration in under ground water reaches as high as 400 ppm due to ammonium sulfate contaminations to bring about serious circumstantial problems in France and other countries.

Since, nitrates and free carbonic ions in water can not be removed by electrolysis only once in such cases, it has been impossible to convert the water of this kind into satisfactory ionized alkaline water by electrolysis.

Next, in the case of obtaining alkaline water at a desired pH value by the electrolysis of water, the ratio of supplying water in the electrolytic vessel, that is, the raito of alkaline water to acidic water is about 2:1 at the highest. If the ratio of the alkaline water is increased more, pH value in the alkaline water becomes insufficient for practical use. Accordingly, about ⅓ of the water supplied as the starting material is discarded in the case of forming alkaline water to worsen the yield of the alkaline water formed based on the amount of water supplied, which is economically disadvantageous. Similar problems also occur in the case of obtaining acidic water.

SUMMARY OF THE INVENTION

Accordingly, it is a principal object of the present invention to provide an apparatus for forming electrolytically ionized water comprising a series of electrolysis devices in which only one of ionized alkaline water and ionized acidic water formed through the primary electrolysis is subjected to electrolysis at the secondary or further successive stages, capable of obtaining alkaline or acidic water at high concentration and capable of increasing the yield of ionized alkaline water or acidic water based on the amount of water supplied.

Another object of the present invention is to improve the function and the usefulness of the apparatus for forming electrolytically ionized water as described above by the use of various types of devices in combination wi th such an apparatus.

The present inventor has made various studies, taking notice on the finding that electroconductivity is improved in the ionized water formed through electrolysis and, as a result, has found that when only the ionized alkaline water obtained by electrolysis at a certain state is subjected to electrolysis at the secondary or further successive stages by the method of introducing through the water supply portion of the electrolysis device at the succeeding stage for electrolysis, the acidic ingredient is removed stepwise, the alkaline ion concentration is remarkably improved and, when only the acidic water discharged from the electrolysis device at the primary stage is electrolyzed again in the electrolysis device at the secondary stage on the other hand, the acidic water is decomposed into alkaline water and acidic water thereby increasing the amount of the formed alkaline water based on the supplied water relatively, and has accomplished the present invention based on such a finding.

The foregoing principal object of the present invention can be attained by an water electrolyzing apparatus including a plurality of electrolysis devices each comprising an electrolysis vessel having a cathode and an anode opposed to each other and an electrolysis diaphragm partitioning them into a cathode chamber and an anode chamber, water supply channels each disposed on one side and two discharge systems of an ionized alkaline water discharge channel in communication with the cathode chamber and an ionized acidic water discharge channel in communication with the anode chamber disposed each disposed on the other side of the vessel, the plurality devices being connected in series in a plurality of stages such that only one of the two ionized water discharge channels of the electrolysis device at a certain stage constitutes a water supply channel to the electrolysis device at the succeeding stage.

Another object of the present invention can be attained by the apparatus for forming electrolytically ionized water in which electrodes material is used in common with the cathode and the anode as described later, a flow channel switching device, a flow rate conditioning member, a flow switch, etc. are combined to the water supply-discharge circuit and a magnetic supply device or an electronic supply device, etc. are combined to the electrolysis vessel of the apparatus.

DESCRIPTION OF THE ACCOMPANYING DRAWINGS

These and other objects, as well as advantageous features of the present invention will become more apparent by reading the following description for the preferred embodiments according to the present invention referring to the appended drawings, wherein.

DESCRIPTION OF THE PREFERRED EMBODIMENT

This invention will be explained for its preferred embodiments referring to the accompanying drawings.

Figure 1:
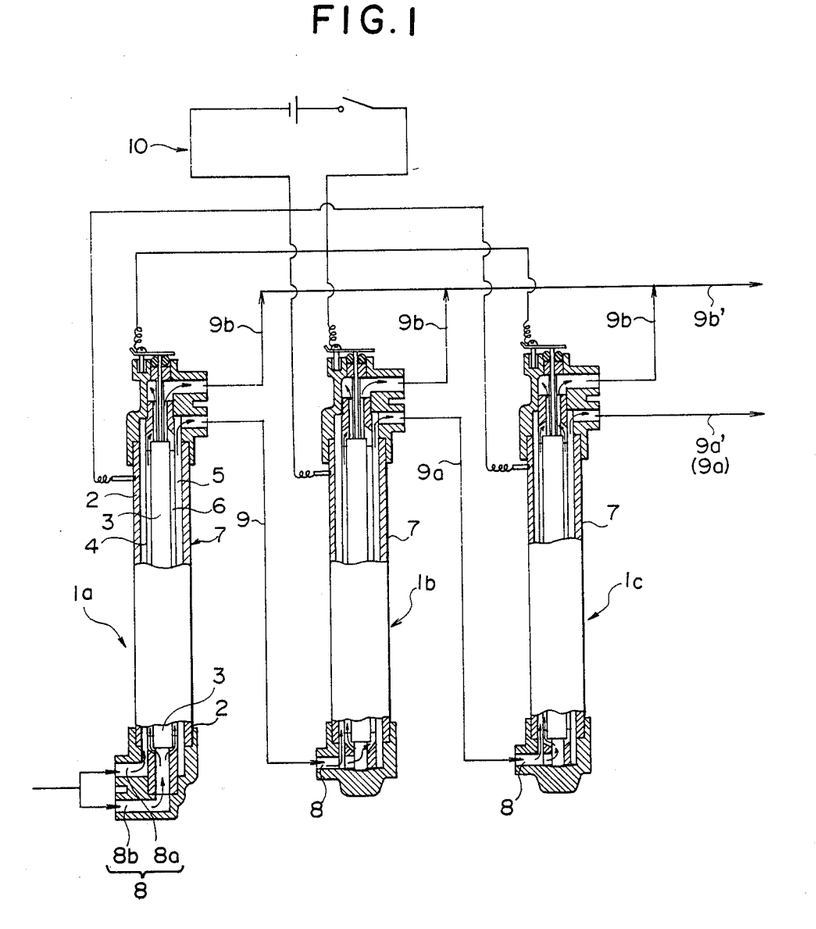
FIG. 1 is a system diagram showing the fundamental constitution of the present invention.

FIG. 1 is a flow chart illustrating the basic constitution of the apparatus for forming electrolytically ionized water according to the present invention. As shown in the figure, a plurality of electrolysis units (devices) 1a, 1b and 1c are used in the apparatus of the present invention, in which each of the electrolysis units in the embodiment of FIG. 1 comprises an electrolysis vessel 7 having a cathode 2 and an anode 3 opposed to each other and an electrolysis diaphragm 4 for partitioning the space between both of the electrodes 2, 3 into a cathode chamber 5 and an anode chamber 6.

A water supply channel 8 in communication with the inner electrode chambers is disposed on one side of the electrolysis vessel 7, while an ionized alkaline water discharge channel 9a in communication with the cathode chamber 5 and an ionized acidic water discharge channel 9b in communication with the anode chamber 6 are disposed on the other side of the electrolysis vessel 7.

Each of the electrolysis units 1a, 1b, 1c is so adapted that water supplied to the inside of the electrolysis vessel 7 is electrolyzed by electrolysing DC voltage applied from a power source circuit 10 to both of the electrodes 2, 3, and alkaline water and acidic water are discharged from an alkaline water discharge channel 9a and an acidic water discharge channel 9b separately. Further, a plurality of electrolysis units are connected in two or more stages in series such that either one of the alkaline water discharge channel 9a or the acidic water discharge channel 9b from the primary electrolysis unit 1a is connected to the water supply channel 8 of the electrolysis unit 1b at the succeeding stage and, if required, one of the alkaline water discharge channel 9a or the acidic water discharge channel 9b of the second electrolysis unit 1b, that is, the same type of the discharge channel as that connected from the primary electrolysis unit 1a to the secondary electrolysis unit 1b is connected to the water supply channel 8 of the third electrolysis unit 1c as shown in the drawing.

In the embodiment shown in FIG. 1, the ionized alkaline water discharge channel 9a is connected in series with a plurality of electrolysis units 1a, 1b and 1c, but a complementary structure, i.e., series connection of the ionized acidic water discharge channels 9b depending on the purpose of use is of course emcompassed with the technical idea of the present invention. In either of the cases, water from the other discharge channels that are not connected in series may be discharged individually or, preferably, discharged collectively as a joined discharge channel 9b' for the discharge channels 9b from a plurality of electrolysis units as illustrated in the drawing.

The cathode 2 and the anode 3 for the electrolysis units 1a, 1b, 1c may be made of different materials suitable to respective electrodes, but they may be preferably made of such electrode material used in common both for the cathode and the anode capable of conducting usual electrolytic process by switching the polarity of the electrolyzing voltage. Since the use of the electrodes made of such material enables to continue the operation for generating electrolytically ionized water by switching the polarity of the voltage to thereby dissolve calcium deposited in the electrolysis vessel 7 with acidic water during electrolysis, maintenance for cleaning can significantly be reduced.

The electrode material for such application uses can include, for example, those of porcelains, for example, ferrite; magnetite; ceramics applied with gold or platinum surface treatment with glacials; those ceramics mixed with other electroconductive material; other ceramics usable as the anode comprising ceramics titanium, titanium alloys, noble metal-plated titanium; alloy materials for preventing consumption of the anode by the anode decay at the electrode surface by the function of electric charges of alloy ions with each other.

The water supply channel 8 to the electrolysis vessel 7 may be a common water supply channel as that for the secondary and the third electrolysis vessels 1b i.e., in common with both of the cathode chamber 2 and the anode chamber 3 in the electrolysis vessel 7, but it may be constituted as a pair of independent water supply channels 8a, 8b in communication individually with the cathode chamber 2 and the anode chamber 3. The main merit of the latter constitution is that since the chemical additives such as minerals to be supplied to the cathode chamber 2 can previously be introduced in admixture with water in the water supply channel 8a on the side of the cathode chamber 2, there is no trouble of disposing a chemical supply channel to the electrolysis vessel 7 and, further, the addition of the chemicals can be unified.

Further, a magnetic effect may be exerted on the water during electrolysis by using a permanent magnet to the electrodes 2 and/or 3.

Furthermore, the overall electrolytic efficiency in the apparatus according to the present invention can be improved further by reducing the electrode gap in the electrolysis unit at the succeeding stage relative to that in the electrolysis unit at the preceeding stage, increasing the electrolyzing time in the succeeding stage or increasing the electrolyzing voltage at the succeeding stage.

Figure 2:
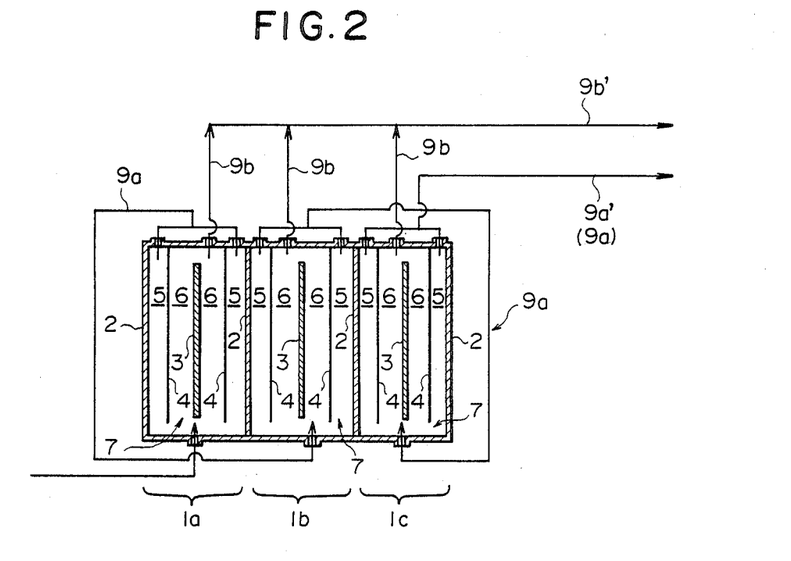
FIG. 2 is a schematic vertical cross sectional view illustrating another embodiment of the present invention.

Although the use of a cylindrical electrolysis vessel is exemplified for the embodiment shown in FIG. 1, it is of course possible to use a flat type electrolysis vessel as shown in FIG. 2, in which each pair of plate-like cathode 2 and anode 3 is disposed in parallel on both opposite sides of a plate-like electrolytic diaphragm.

In the case of using the flat type electrolysis unit, it is preferred to dispose the water supply portion and the water discharge portion of the electrolysis vessel near the opposing ends of the diagonal line in a rectangular cross sectional form of the vessel. While the running water type electrolysis unit tends to generate heat if water under electrolysis causes stagnation, water can prevail well through every corners of the cross sectional rectangular form of the electrolysis vessel in such a constitution to reduce the stay of water at corner portions.

The foregoing constitution of the present invention can also be applied in the similar manner to the case of using a batch type electrolysis unit in which stationary water is electrolyzed for a predetermined of time.

The fundamental constitution for attaining the principal purpose of the present invention is as has been described above, and it is possible to further improve the function of the entire apparatus by combining various types of units described later to the apparatus for forming electroytically ionized water having the fundamental constitution as described above.

In the cae of using the material in common both for the cathode 2 and the anode 3, the function of the electrolytically ionized water discharge channels 9a, 9b are changed by the switching of the voltage polarity at the electrodes to bring about confusion on the side of taking out water. In order to prevent this and enable to always take out specific kind of electrolytically ionized water from a specific water taking out port, a flow channel switching unit 11 is disposed to the ionized water discharge channel 9a' at the final stage of the serially connected ionized water discharge channels (9a in the drawing) and to the ionized water discharge channels 9b' on the other side after they are joined. It is of course possible to dispose the flow channel switching unit 11 to every ionized channels 9a, 9b for each of the electrolysis units 1a, 1b, 1c.

Figure 3:
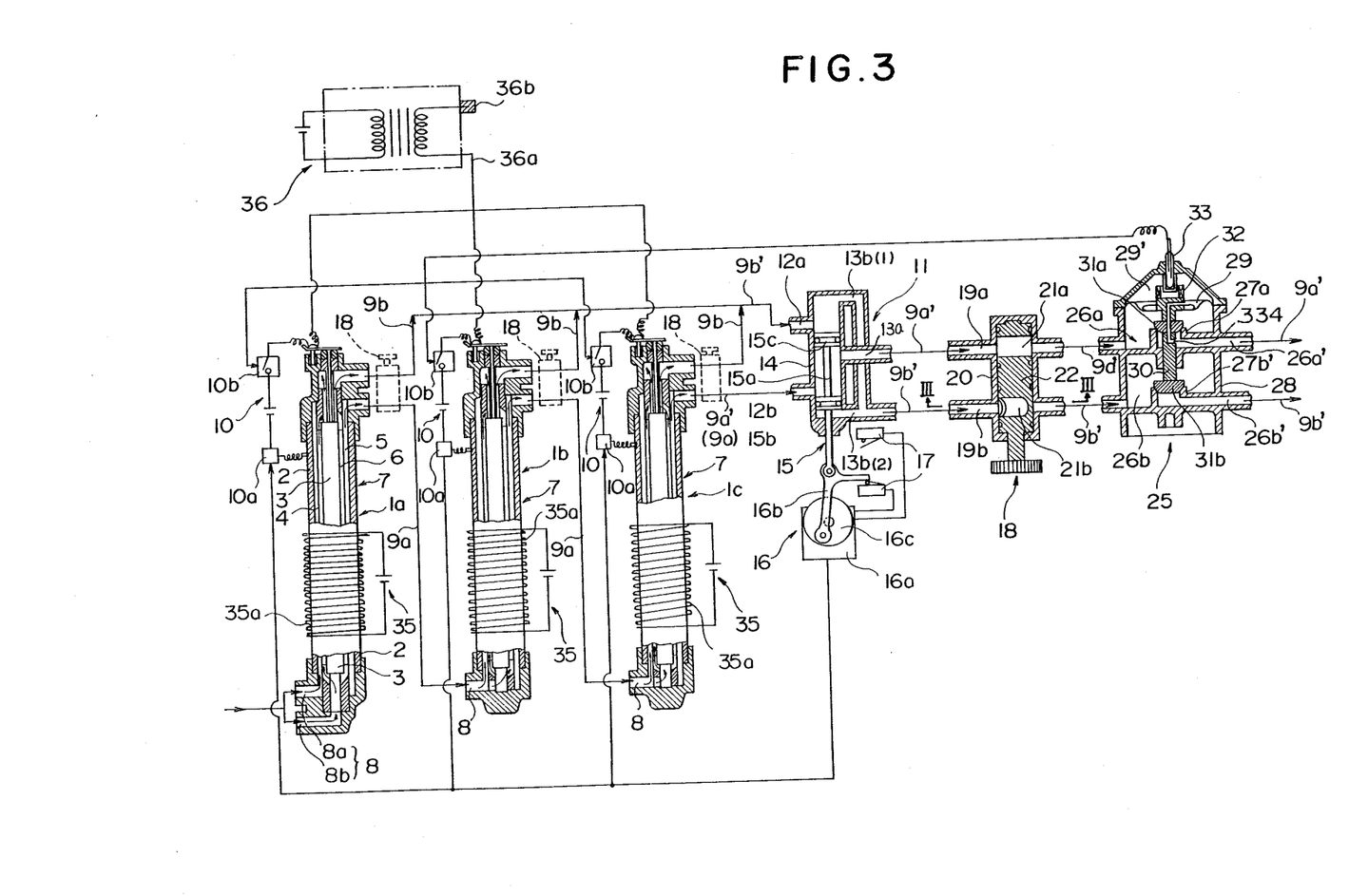
FIG. 3 is a view of another embodiment of the present invention in which the fundamental constitution is combined with other devices, which corresponding to FIG. 1.

The flow channel switching valve 11 comprises, for example, as shown in FIG. 3 a cylindrical casing 14 containing a pair of introduction portions 12a, 12b for connection with the discharge channels 9a', 9b' respectively and water discharge pipes 13a, 13b for separately discharging alkaline water and acidic water respectively and a flow channel switching slide valve 15 fitted in a liquid-sealing and slidable manner to the inside thereof. In this embodiment, the paired introduction portions 12a, 12b are disposed with a axial gap of the casing 14.

The water discharge pipe 13a of the paired discharge pipes 13a, 13b is disposed at a position between the introduction portions 12a, 12b, while the other water discharge pipe 12b is biforkate at the junction with the casing 14 and the forked branches 13b(1), 13b(2) are in communication with the ends of the casing 14 respectively.

The slide valve 15 comprises a rod 15a and two valve bodies 15b, 15c secured thereto at a predetermined distance with each other. The valve bodies 15b and 15c are disposed in such a postional relationship that the communication of the introduction portions 12a and 12b are switched upon reciprocal movement of the slide valve 15 from the communication state with the one water discharge pipe 13a to the communication state with the other water discharge pipe 13b by way of the casing end alternately in an interlocked manner.

Although the slide valve 15 may be driven manually, it is preferably actuated by a driving device 16 as shown in the drawing by using a motor 16a. Further, a detector 17 such as a limit switch may be disposed near the slide valve 15 for detecting the position of the valve 15 and controlling the motor 16a by the detection signal. Further, the motor 16a may be interlocked with the polarity changing switch 10a for the electrolysis units 1a, 1b, 1c so that the flow channel in the flow channel switching valve device 11 can be switched upon voltage polarity changing of the electrolysis unit 1 (or vice versa). By the way, in the illustrated embodiment, the top end of the slide valve 15 and the motor 16a are connected by way of a crank 16b and a cam 16c so that the slide valve 15 can be driven reciprocately by the electric driving, as well as a detector 17 such as a limit switch is disposed near the crank 16b for detecting the position of the slide valve 15.

The driving mens is not necessarily restricted only to the embodiment shown in the drawing but it may be actuated by a solenoid or the like.

Alternatively, the polarity changing switch 10a and the flow channel switching valve device 11 may be switched automatically on every predetermined of time by using a timer.

Figure 4:
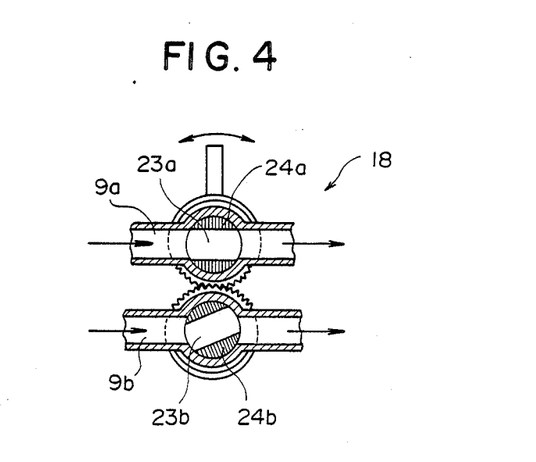
FIG. 4 is a vertical cross sectional view illustrating another embodiment of the flow rate ratio control device shown in FIG. 3.

Furthermore, a flow rate ratio control unit 18 may be disposed to the pair of the ionized wter discharge channels 9a, 9b (or 9a', 9b') of the water electrolylzing apparatus according to the present invention for adjusting the ratio of the flow rate between both of the discharge channels thereby controlling the pH value of the water formed by electrolysis. The flow rate ratio control device may comprise, for example, as shown in FIG. 3, a valve case 20 having two channels 19a, 19b for connection with a pair of ionized water discharge channels 9a' 9b', and coaxial type valve 22 tightly fitted to the valve casing 20 and having a pair of through holes 21a, 21b formed at different angles to the direction of the corresponding discharge water channels formed corresponding to the two channels 19a, 19b. Further, the rotary type valve 22 may be replaced with such a structure, not illustrated, that a slide valve body having a pair of through holes or valves displaced slightly from the gap between the two channels 19a, 19b is slidably fitted to the inside of the casing, so that the flow rate ratio between the channels 19a, 19b is adjusted by moving the slide valve body axially at the inside of the valve casing. Furthermore, it may be a parallel-axis type flow rate ratio control valve, as shown in FIG. 4, comprising a pair of outer teethed rotary valve bodies 24a, 24b having lateral channels 23a, 23b respectively corresponding to the discharge channels 9a, 9b in which the respective valve bodies are engaged with each other in a manner capable of interlocking by way of peripheral gears such that the respective valve body channels 23a, 23b may take different angular positions to the pipeway direction of the corresponding discharge channels 9a, 9b. Any two interlocking valve mechanisms may be used so long as they are adapted such that when one of them is actuated in the direction of increasing the opening degree, for example, of the alkaline water discharge channel 9a', the other of them is driven to restrict the opening degree for the acidic water discharge channel 9' in view of the positional relationship with the pipeway direction of the respective discharge channels 9a, 9b'.

In the embodiment shown in FIG. 3, although the flow rate ratio control device 18 is disposed to the ionized water discharge channels 9a', 9b' at the final stage, it may be disposed to the electrolyzed water discharge channel 9a, 9b for each of the electrolytic units 1a, 1b, 1c as shown by the phantom line in FIG. 3.

Further, in the apparatus according to the present invention, a 2-stage flow switch valve 25 capable of generating ON-OFF signals may be disposed to the pair of electrolyzed water discharge channels 9a'', 9b''.

The 2-stage flow switch valve 25 illustrated in FIG. 3 comprises two systems of channels 26a, 26b for communication with the pair of discharge channels 9a', 9b', valve seats 27a, 27b disposed for opening/closing the respective channels 26a, 26b, which are contained in a valve casing 28, a diaphragm 29 disposed in one of the channels and moved vertically by hydraulic pressure in the channel, a valve rod 30 integrally secured to the diaphragm 29 and passing through the two channels 26a, 26b, a main valve body 31a and a following valve body 31b secured integrally to the valve rod 30 for simultaneously opening/closing the two valve seats 27a, 27b, so that the two systems channels 26a, 26b are opened/closed simultaneously by the two valve bodies 31a, 31b of the valve rod 30 moved integrally with the diaphragm 29.

A water passing channel 34 is formed in the valve rod 30 for communicating the chamber 29' above the diaphragm 29 with the channel 26a downstream to the main valve body 27b and adapted so that when a cock on the side of taking out water is turned ON and OFF, the pressure in the chamber 29' above the diaphragm 29 varies depending on the movement of the water by way of the water supply channel 34 to thereby actuate the diaphragm 29.

Further, a magnet 32 is attached on one side of the valve rod 30, whereas an ON-OFF signal generation device 33 such as a lead switch for generating signals upon approaching and aparting of the magnet 32 is mounted on the opposite side, so that the operation of the electrolyzing voltage circuit 10 can be controlled by the electrolysis unit.

Figure 5:
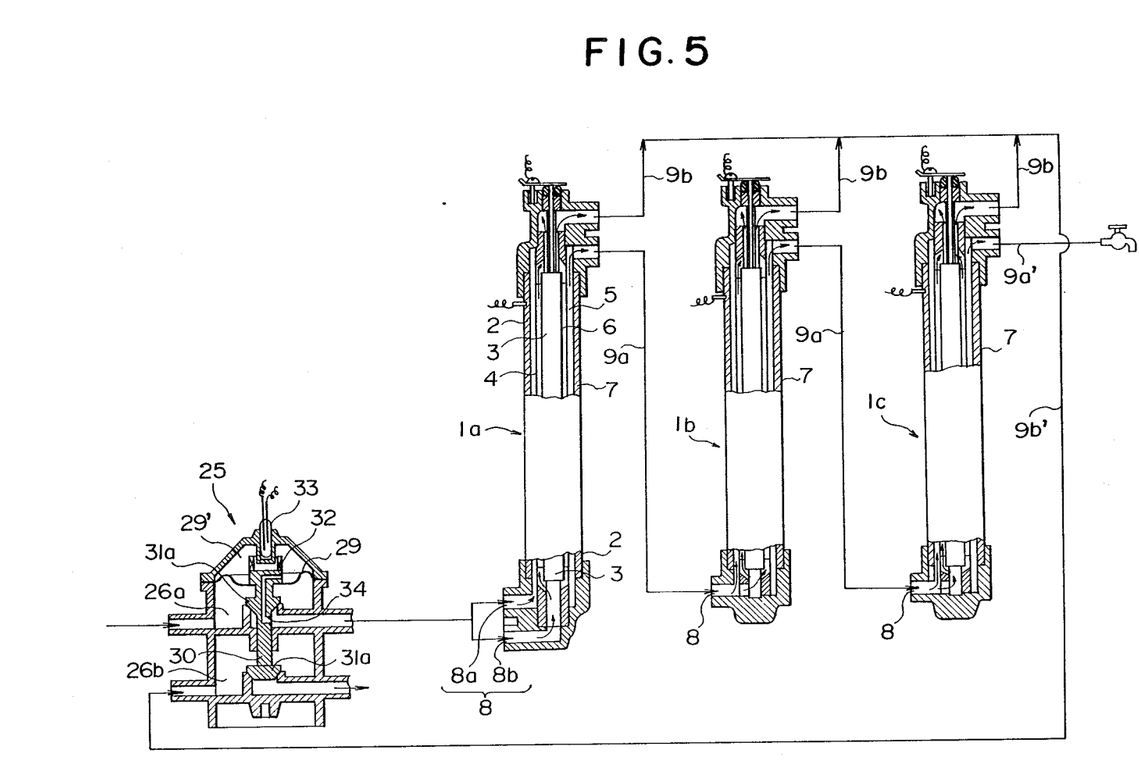
FIG. 5 is a view illustrating another embodiment of the present invention, which corresponds to FIG. 3 in which a flow switch valve is incorporated to the fundamental constitution of the present invention.

FIG. 5 illustrates a further embodiment in which a flow valve switch 25 is assembled into the electrolysis apparatus having the fundamental constitution according to the present invention. This embodiment is adapted such that water supplied as the starting material to the primary electrolysis unit 1a is introduced by way of the channel 26a of the 2-stage flow switch valve 25 on the side of the main valve body 31a (the channel on the side of disposing the diaphragm), as well as the acidic water from the electrolysis units 1a, 1b, 1c is discharged passing through the channel 26b of the flow switch valve 25 on the side of the following valve body 31b. Since the alkali water is not passed through the flow switch valve 25 in this structure, the flow switch valve free from the effect of calcium deposited in the alkaline water.

Then, it is also possible to dispose a magnetic supply device 35 near one or all of the electrolysis vessels 7 of the electrolysis unit to thereby exert the magnetic effect on the water in the vessel. The magnetic supply device 35 may be structured by disposing a coil unit 35a forming magnetic fields by electric current to the outside of the electrolysis vessel 7 as shown in FIG. 3. Further, permanent magnets 35b may be disposed instead of them.

Further, the permanent magnet 35b as the magnetic supply device 35 may be disposed to the inside of the electrolysis vessel 7.

Figure 6A:
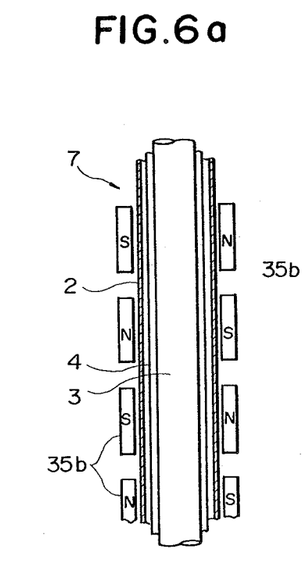
FIG. 6a through FIG. 6d are vertical cross sectional views illustrating other embodiments of the magnetic generation device.
Figure 6B:
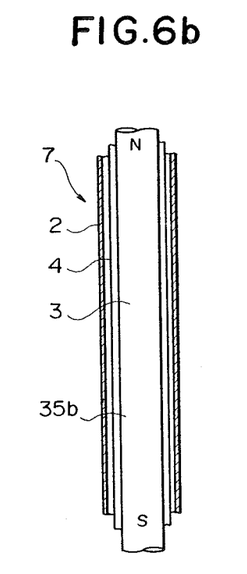
Figure 6C:
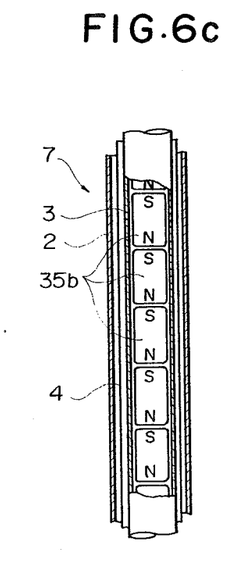

For example, the electrode 3 itself in the electrolysis vessel 7 may be constituted with a permanent magnet 35b or, as shown in FIG. 6c, the inner electrode 3 is made tubular, and the permanent magnet 35b may be incorporated to the inside thereof.

Figure 6D:
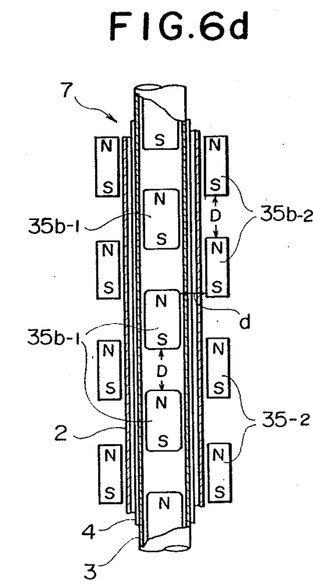

Further, as shown in FIG. 6d, it may also be adapted so that a plurality of inner permanent magnets 35b-1 are disposed at a predetermined interval along the longitudinal direction and a plurality of ring-like permanent magnets 35b-2,—may be disposed at a predetermined interval also in the longitudinal direction at the outside of the electrolysis vessel 7. In this case, it is preferred that the inner permanent magnets 35b-1 and the outer permanent magnets 35b-2 are set such that the N and S poles of the adjacent magnets are opposed to each other, as well as the inner magnets 35b-1 and the outer magnets 35b-2 are also disposed such that their N and S poles are opposed to each other on both sides of the electrode chambers 5 and 6. As shown in the drawing, it is more preferable that each of the two outer magnets 35b-2 is disposed so as to overriding the two adjacent inner magnets 35b-1, since the magnetic force can uniformly exerted in the longitudinal direction of the electrode chamber.

In the case of the embodiment shown in FIG. 6d, it is desirable that the longitudinal distance D of the inner or the outer magnets is made greater than the distance d between the inner magnet 35b-1 and the outer magnet 35b-2. If the longitudinal distance of the magnets is shorter than that between the inner and the outer magnets, the larger magnetic force is exerted in the longitudinal direction to reduce the efficiency of the magnetic effect on the electrode chambers 5, 6.

Further, as shown in FIG. 3, it is also possible that an electron-inducing high DC or AC voltage generating device 36 having an output terminal 36b for one pole being insulated is disposed to a portion or all of a plurality of electrolysis units 1a, 1b, 1c used in the apparatus according to the present invention, in addition to the electric circuit 10 for applying electrolysis voltage, and the output terminal for the other pole of the high voltage generation circuit 36, that is, the non-insulation side terminal is electrically connected by way of an electroconductor to the inner electrode 3 in the electrolysis vessel 7 thereby inducing electrons e⁻ to the water in the electrolysis vessel 7. The voltage applied in this case from the high voltage generation unit 36 is as high as from about 300 to about 10,000 V. However, the voltage applied for electron induction is not determined uniformly depending on the distance between both of the electrodes 2, 3 in the electrolysis vessel 7. That is, if the voltage applied is too high relative to the distance between both of the electrodes 2 and 3, the electrodes will be short-circuited failing to obtain the purpose. Accordingly, the voltage of the high voltage generation unit 36 is set to such a suitable level depending on the distance between the electrodes 2, 3 so as not to short-circuit the electrodes but effectively induce electrodes e⁻.

In the illustrated embodiment, although the side of the alkaline water discharge channels is connected in series to a plurality of electrolysis units, the present invention also includes the case of connecting the discharging channels on the side of acidic water in series. The latter case can be used in the case of electrolyzing acidic water obtained from the electrolysis at the preceeding stage further into alkaline water and acidic water thereby increasing the amount of the alkaline water.

In the embodiment shown in FIG. 1, since only the ionized alkaline water formed from each of the electrolysis units is connected in series with the electrolysis unit at the succeeding stage for further electrolyzing processing, the acidic ingredient is removed from alkali water on every electrolyzing process in the electrolysis units and, accordingly, water at high alkali concentration can gradually be obtained to form alkaline water at high concentration. Particularly, since nitrate or free carbonic acid in water can be removed to render the water alkaline, the present invention can also be utilized for the purification of undergroudn water contaminated with fertilizers.

While on the other hand, in the case of serially connecting the side of discharge channels for the acidic ionized water, since acidic water electrolyzed in the unit at the preceeding stage is partially separated as alkaline water by the electrolyzing process in the electrolysis unit at the succeeding stage, the amount of the alkaline water formed is increased relatively to utilize the supplied water with no loss. The situation is the same also in the case of preparing the acidic water.

In the apparatus as described above, in the case of using material used in common both for the cathode and the anode of the electrodes 2 and 3 of the electrolysis unit, cleaning for calcium deposited in the electrolysis vessel can be conducted automatically along with the continuous conduction for the electrolysis by switching the voltage polarity of the electrodes. If the flow channel switching unit 16 is used together, since the water is discharged from a predetermined water taking out port irrespective of the polarity switching in the electrolysis unit, there is no worry of mistaking the alkaline water and the acidic water to each other at the water taking out port.

Since the ratio for the amount of water passing through each of the electrode chambers is varied by operating the flow rate ratio control unit 18, the pH value of ionized water formed is varied. Accordingly, pH can be adjusted by simple procedures.

In the case of incorporating the 2-stage flow switch valve 25 to the apparatus according to the present invention, when a tap on the water taking out side of utilizing discharge channel is turned ON and OFF, it also controls ON and OFF of the other discharging channel in an interlocking manner and the ON-OFF operation of the tap and the ON-OFF operation of the electrolysis unit are interlocked. Particularly, in the case of flowing supply water and acidic water to the two channels of the 2-stage flow switch valve, since the calcium deposited in the alkaline water is eliminated, the valve durability cna be remarkably improved.

In a case where the magnetic generation device 35 is incorporated in the apparatus according to the present invention and the magnetic force is exerted on water during electrolysis from the magnetic generation device, water is easily put under the magnetic effect and it is possible to effectively produce magnetized ionized water and the ion permeation state through the diaphragm can be controlled in various ways since water is electrolyzed under the effect of magnetic force. The ion hydration due to electrolysis and physiological activation due to magnetization can be interacted advantageously with each other.

Further, when a high voltage generation unit 36 insulated at one output terminal is disposed to the electrolysis unit of the apparatus according to the present invention and a high voltage (for instance 100-5000 V) is applied from the high voltage generation unit to the electrode of the electrolysis vessel, electrons are induced into the electrolysis vessel. Accordingly, since electrolyzed water is improved into water containing more electrons $e^-$, water desirable for keeping health can be obtained, as well as ionized state such as of calcium, etc. in the ionized alkaline water can be maintained for a long period of time due to the pressure of electrons $e^-$ thereby promoting the replacement with iron ion (Fe) in the iron pipes to retainthe generation of rusts. Further, since the gaseous ingredients in the electrolyzed water are also ionized upon receiving electrons $e^-$, it can also prevent the occurrence of rusts in the iron pipes due to oxygens, etc.

What is claimed is:

1. A water electrolyzing apparatus including:
   a plurality of electrolysis devices, each comprising an electrolysis vessel having a cathode and an anode opposed to each other and an electrolysis diaphragm partitioning the space between both of the electrodes into a cathode chamber and an anode chamber, wherein each electrolysis vessel has a water supply channel disposed at one end thereof and two discharge systems disposed at an opposite end from said water supply channel, said two discharge systems including an ionized alkaline water discharge channel in communication with said cathode chamber and an ionized acidic water discharge channel in communication with said anode chamber;
   said plurality of electrolysis devices being connected in series in a plurality of stages such that only one of the two ionized water discharge channels of the electrolysis device at a certain preceding state constitutes a water supply channel to the electrolysis device at a succeeding stage.

2. A water electrolyzing apparatus as defined in claim 1, wherein electrode material is used in common with the cathode and the anode which enables operation for forming electrolytically ionized water by switching the polarity of electrolyzing voltage.

3. A water electrolyzing apparatus as defined in claim 1 or 2, wherein the water supply channel to the electrolysis vessel at the first stage is constituted as a pair of independent water supply channels communicating individually to the cathode chamber and the anode chamber of the electrolysis vessel respectively.

4. A water electrolyzing apparatus as defined in any one of claims 1 to 2, wherein at least one of the electrodes of the electrolysis vessel is made of a permanent magnet.

5. A water electrolyzing apparatus including:
   a plurality of electrolysis devices, each comprising an electrolysis vessel having a cathode and an anode opposed to each other and an electrolyzing diaphragm partitioning the space between both of the electrodes into a cathode chamber and an anode chamber, wherein each electrolysis vessel has a water supply channel disposed at one end thereof and two discharge systems disposed at an opposite end from said water supply channel, said two discharge systems including an ionized alkaline water discharge channel in communication with said cathode chamber and an ionized acidic water discharge channel in communication with said anode chamber;
   said plurality of electrolysis devices being connected in series in a plurality of stages such that only one of the two ionized water discharge channels of the electrolysis device at a certain preceding stage constitutes a water supply channel to the electrolysis device at the succeeding stage, and the other of the two ionized water discharge channels from the electrolysis devices are joined together into a single stream,
   electrode material being used in common with the cathode and the anode which enables operation for forming electrolytically ionized water by switching the polarity of electrolyzing voltage, and a flow rate switching device put to the final stage of the ionized water discharge channels connected in series and to the other ionized water discharge channel after joining.

6. A water electrolyzing apparatus including:
a plurality of electrolysis devices, each comprising an electrolysis vessel having a cathode and an anode opposed to each other and an electrolyzing diaphragm partitioning the space between both of the electrodes into a cathode chamber and an anode chamber, wherein each electrolysis vessel has a water supply channel disposed at one end thereof and two discharge systems disposed at an opposite end from said water supply channel, said two discharge systems including an ionized alkaline water discharge channel in communication with said cathode chamber and an ionized acidic water discharge channel in communication with said anode chamber;
said plurality of electrolysis devices being connected in series in a plurality of stages such that only one of the two ionized water discharge channels of the electrolysis device at a certain preceding stage constitutes a water supply channel to the electrolysis vessel at a succeeding stage, and the other of the two ionized water discharge channels from the electrolysis devices are joined together into a single stream, and
a flow rate ratio control unit put to the final stage of the serially connected ionized water discharge channel after joining and/or to the portion or entire pairs of ionized water discharge channels 9a, 9b.

7. A water electrolyzing apparatus including:
a plurality of electrolysis devices, each comprising an electrolysis vessel having a cathode and an anode opposed to each other and an electrolyzing diaphragm partitioning the space between both of the electrodes into a cathode chamber and an anode chamber, wherein each electrolysis vessel has a water supply channel disposed at one end thereof and two discharge systems disposed at an opposite end from said water supply channel, said two discharge systems including an ionized alkaline water discharge channel in communication with said cathode chamber and an ionized acidic water discharge channel in communication with said anode chamber,
said plurality of electrolysis devices being connected in series in a plurality of stages such that only one of the two ionized water discharge channels of the electrolysis device at a certain preceding stage constitutes a water supply channel to the electrolysis vessel at a succeeding stage, and the other of the two ionized water discharge channels from the electrolysis devices are joined together into a single stream, and
a 2-stage interlocking type flow switch valve having a pair of independent channels put to the final stage of the ionized water discharge channels connected in series and to the other ionized water discharge channel after joining.

8. A water electrolyzing apparatus including:
a plurality of electrolysis devices, each comprising an electrolysis vessel having a cathode and an anode opposed to each other and an electrolyzing diaphragm partitioning the space between both of the electrodes into a cathode chamber and an anode chamber, wherein each electrolysis vessel has a water supply channel disposed at one end thereof and two discharge systems disposed at an opposite end from said water supply channel, said two discharge systems including an ionized alkaline water discharge channel in communication with said cathode chamber and an ionized acidic water discharge channel in communication with said anode chamber,
said plurality of electrolysis devices being connected in series in a plurality of stages such that only one of the two ionized water discharge channels of the electrolysis device at a certain preceding stage constitutes a water supply channel to the electrolysis vessel at a succeeding stage, and the other of the two ionized water discharge channels of the electrolysis device are joined together into a single stream, and
a 2-stage interlocking type flow switch valve having a pair of independent channels put to the water supply channel of the electrolysis device at the first stage and to the other of the ionized water discharge channel after the joining.

9. A water electrolyzing apparatus including:
a plurality of electrolysis devices, each comprising an electrolysis vessel having a cathode and an anode opposed to each other and an electrolyzing diaphragm partitioning the space between both of the electrodes into a cathode chamber and an anode chamber, wherein each electrolysis vessel has a water supply channel disposed at one end thereof and two discharge systems disposed at an opposite end from said water supply channel, said two discharge systems including an ionized alkaline water discharge channel in communication with said cathode chamber and an ionized acidic water discharge channel in communication with said anode chamber,
said plurality of electrolysis devices being connected in series in a plurality of stages such that only one of the two ionized water discharge channels of the electrolysis device at a certain preceding stage constitutes a water supply channel to the electrolysis vessel at a succeeding stage, and
a magnetic supply device for forming magnetic fields to the inside of the electrolysis vessel disposed to a portion or all of the plurality of electrolysis devices.

10. A water electrolyzing apparatus including:
a plurality of electrolysis devices, each comprising an electrolysis vessel having a cathode and an anode opposed to each other and an electrolyzing diaphragm partitioning the space between both of the electrodes into a cathode chamber and an anode chamber, wherein each electrolysis vessel has a water supply channel disposed at one end thereof and two discharge systems disposed at an opposite end from said water supply channel, said two discharge systems including an ionized alkaline water discharge channel in communication with said cathode chamber and an ionized acidic water discharge channel in communication with said anode chamber,
said plurality of electrolysis devices being connected in series in a plurality of stages such that only one of the two ionized water discharge channels of the electrolysis device at a certain preceding stage constitutes a water supply channel to the electrolysis vessel at a succeeding stage, and a DC or AC electron inducing high voltage generation device insulated at one of the terminals disposed, with the other not-insulated terminal of said high voltage generation unit being electrically connected to either one of partial or entire electrodes of a plurality of electrolysis devices.

* * * * *